UNITED STATES PATENT OFFICE.

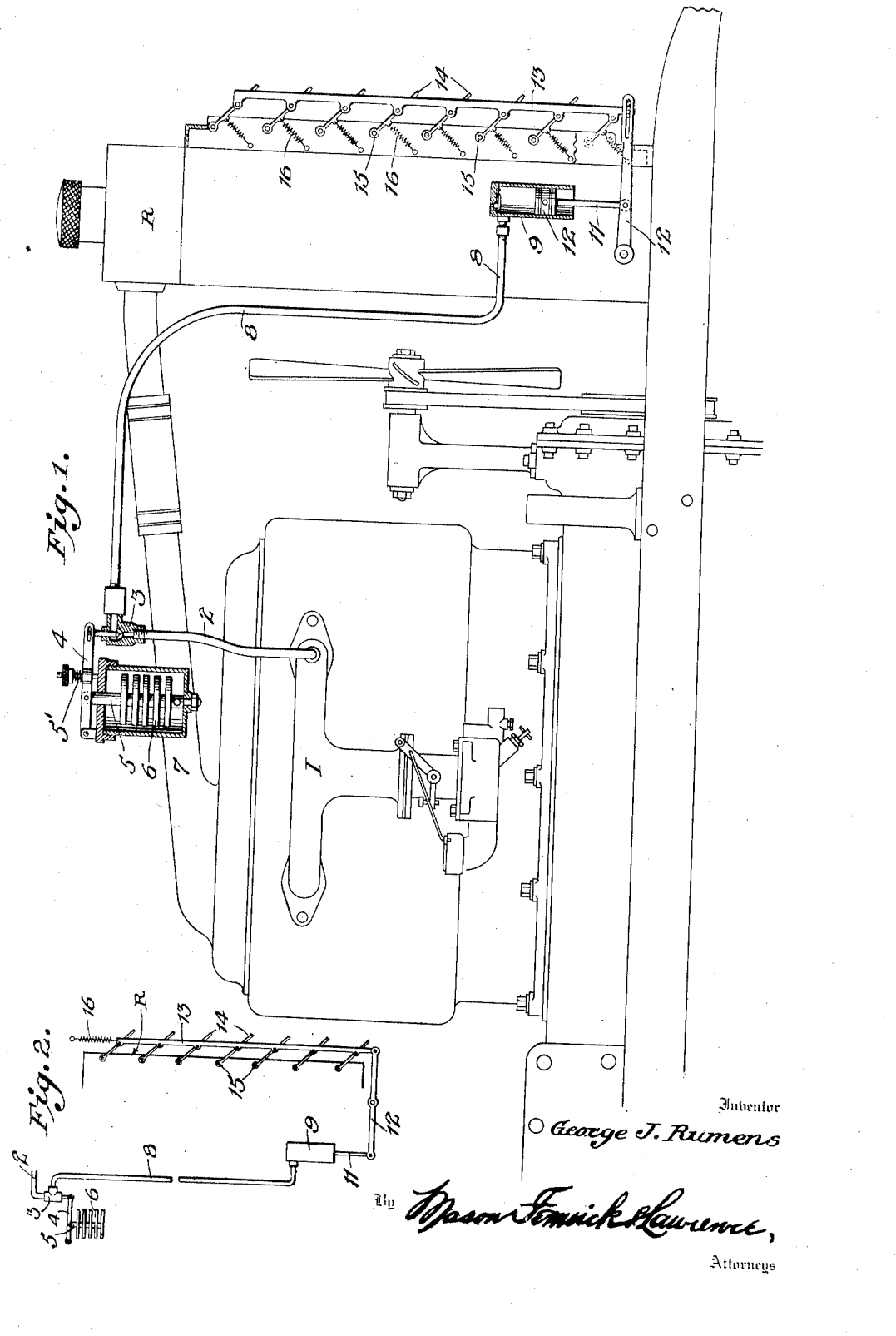

GEORGE J. RUMENS, OF BALTIMORE, MARYLAND.

COOLING APPARATUS FOR MOTOR-VEHICLES.

1,390,724.   Specification of Letters Patent.   Patented Sept. 13, 1921.

Application filed April 5, 1917. Serial No. 159,975.

*To all whom it may concern:*

Be it known that I, GEORGE J. RUMENS, a subject of the King of Great Britain, residing at Baltimore, in the State of Maryland, have invented certain new and useful Improvements in Cooling Apparatus for Motor-Vehicles; and I do hereby declare the following to be a full, clear, and exact description of the invention, such as will enable others skilled in the art to which it appertains to make and use the same.

This invention relates to internal combustion engines, and particularly to internal combustion engines the temperature of which is controlled during operation through the medium of a circulating fluid.

It is one of the objects of the present invention to provide means for automatically controlling the temperature of the cooling fluid or water utilized in internal combustion motors for controlling the temperature of the latter, and a further object of the invention is to provide means operative by variations of fluid pressure for operating a shutter to control the flow of air to a radiator when one is utilized, through which the cooling medium is caused to circulate during the operation of the motor, and it is a particular object of the invention to provide means which are operated by variations of fluid pressure to actuate the shutter, and which means are controlled through the medium of a thermostat which is subject to the heat of the cooling water in circulation in the motor.

It is an important object of the present invention to provide a fluid operated, thermostatically controlled mechanism for actuating a shutter, whereby air is controlled in its movement toward or against the radiator of the motor, and to provide a thermostat which controls the operation of a fluid operated mechanism so that the thermostat is relieved of the duty of operating the shutter directly, and thereby permits the employment of a thermostat of comparatively small power and movement.

To that end the present invention consists in the combination with a motor and its radiator, through which circulating cooling fluid may pass, of a shutter so disposed with relation to the radiator that the flow of air thereto is automatically controlled and regulated during the operation of the engine through means of fluid pressure, variation of which is obtained by connection to the intake flue or manifold of the engine, and in which fluid pressure in mechanism is controlled by means of a thermostat adapted to operate a valve, and which thermostat is disposed so as to be subject to the heat of the cooling medium or water used in the cooling of the motor.

With these and other objects in view embodiments of my invention are described in the following specification and illustrated in the accompanying drawing, in which:

Figure 1 is a side elevation of a motor of a vehicle with its radiator, and showing the automatic cooling mechanism as attached thereto.

Fig. 2 shows a slight variation of the arrangement of the links and controlling devices of the apparatus in installation such as arranged for operation in the use of a vehicle in the summertime or seasons of high temperature.

The invention is shown as embodied in combination with a motor M of suitable type and construction, and which is shown as mounted upon a vehicle frame of suitable type. The motor is provided with an intake flue or manifold I from which is extended a tube or pipe 2 of suitable proportions having appropriately located therein a valve 3 which is connected to a lever 4, this in turn being connected to and operable by a stem 5 of a thermostatic devices 6, any suitable type of which may be employed. The thermostat 6 is shown as disposed so as to be connected conveniently for communication with the top or outlet pipe 7 of the water circulating system of the motor so that the thermostat is subjected to the heat of the water passing out of the top of the engine through the connection 7 forwardly to the radiator R.

Connected to the valve 3 is a suitable form of tube or pipe 8 which preferably consists of a small copper tube providing thereby sufficient flexibility to enable the convenient and ready installation of the apparatus upon vehicles as most conveniently afforded. The pipe 8 is connected to a piston cylinder 9 in which there is adapted to reciprocate a piston 10, the lower side of which is exposed freely to atmospheric pressure, the piston being connected by a link or pitman 11 to a lever 12. The lever 12 is shown as provided with a push rod or other suitable connecting device 13 which may be appropriately connected with each of a series of blades 14 which combined are adapted to form a shutter whereby the flow of air to the radiator R may be automatically controlled during the operation of the motor. The shutter blades 14 are shown as extending horizontally across the front of the radiator, and are pivoted at their rear ends at 15 or may be mounted in any other suitable manner. In one installation of the invention, as when it is desired to operate the vehicle in winter or in zones where the temperature may be low, the blades 14 are adapted to be automatically closed through means of springs or other appropriate devices as 16, these operating normally to swing the blades 14 to closed position and thereby prevent the free movement of air toward the face of the radiator R and thus conserve the heat in the latter.

When it is desired to utilize the motor in the summer season, or in zones where the temperature may be high, the mechanism is slightly rearranged, as shown in Fig. 2, so that the springs 16 are so connected to the link 13 on the shutter blades 14 that the latter are adapted to be opened instead of closed as in Fig. 1, by the functioning of the springs.

In operation when the engine is running, for instance during the cool season of the year, or when the temperature is fluctuating between zero and 50 or 60, it is desired to maintain the cooling water at about 160°, and when the water reaches this point and tends to rise higher in temperature, the thermostat 6 automatically extends and actuates the lever 4 to open the valve 3, thus permitting the tendency to create a vacuum in the connecting pipe 8 through reason of the induction of fuel into the manifold intake I. This reduction of pressure in the pipe 8 causes a fall of pressure in the cylinder 9, and therefore atmospheric pressure acts upon the piston 10 and causes this to move upwardly and thus rock the lever 12 so that the shutter blades 14 are opened against the action of the closing springs 16, and air is admitted to the radiator in proportion to the degree of opening of the shutter blades 14 through the actuation of the fluid operated piston 10 and which is determined by the amount of opening of the valve 3 controlled by the thermostat 6. As the circulating fluid in the radiator R is brought down to the normal or required temperature, the valve 3 is permitted to close by the thermostat and the springs 16 then automatically act to close the shutter blades 14 of the radiator. Thus it will be seen that in this form of the invention when the engine is running at approximately normal temperature the shutter blades 14 are nearly closed, and when the vehicle or motor is stopped heat is conserved in the radiator R by the total closure of the shutter blades 14 by their actuating spring or springs 16.

In the operation of that form of the invention shown in Fig. 2, which is the installation desired for use in seasons of high temperature or in zones where the temperatures are high, the spring or springs 16 controlling the shutter blades 14 normally hold the blades 14 open so as to permit free access of air to the radiator, and thus cause the cooling of the circulating medium therein. In the event that the temperature of the cooling medium falls below a given degree, then the valve 3 is opened by the thermostat 6, and the atmospheric pressure acting upon the piston 10 will actuate the lever 12 and cause the closing of the shutter blades 14 so that the radiator may be permitted to heat up again to the required temperature.

From the above it will be seen that I provide means for controlling the temperature of the circulating fluid by the utilization of a shutter which is operated partly automatically in one direction, and in the opposite direction is operated by a fluid pressure controlled mechanism, this latter providing ample power as may be necessary to secure the operation of the shutter, and thus I am enabled to use a thermostat 6 of suitable type of small power and movement, the function of which is simply to open the valve 3 which controls the flow of fluid medium through the fluid operated portion of the mechanism.

To provide for the ready variation and control of the temperature of the circulating fluid, any suitable device may be utilized, as for instance, a spring 5' and a screw or other suitable device for adjusting the tension or strength of the spring so as to increase or decrease the resistance at the thermostat, and thereby control the amount of movement of the valve 3.

What I claim is:

A temperature controlling apparatus for motor vehicles comprising in combination with a motor and its radiator, a shutter for controlling the flow of air to the radiator, a lever loosely connected to the shutter and extending rearwardly therefrom, a cylinder arranged in the rear of the shutter and above the lever, a piston having pivotal connection with the lever and operating within the cylinder, means forming communication between the intake flue of the motor and the cylinder, a valve arranged within said connecting means and a thermostat connected with the valve subject to the heat of the cooling water in the motor for actuating the valve and controlling the pressure between the intake flue and the cylinder.

In testimony whereof I affix my signature.

GEORGE J. RUMENS.